(12) United States Patent
Takahashi et al.

(10) Patent No.: US 11,553,478 B2
(45) Date of Patent: Jan. 10, 2023

(54) TERMINAL, RADIO COMMUNICATION METHOD, BASE STATION, AND SYSTEM

(71) Applicant: NTT DOCOMO, INC., Tokyo (JP)

(72) Inventors: Hideaki Takahashi, Tokyo (JP); Kazuki Takeda, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 75 days.

(21) Appl. No.: 17/257,693

(22) PCT Filed: Jul. 3, 2019

(86) PCT No.: PCT/JP2019/026442
§ 371 (c)(1),
(2) Date: Jan. 4, 2021

(87) PCT Pub. No.: WO2020/009144
PCT Pub. Date: Jan. 9, 2020

(65) Prior Publication Data
US 2021/0282122 A1 Sep. 9, 2021

(30) Foreign Application Priority Data
Jul. 5, 2018 (JP) .............................. JP2018-138884

(51) Int. Cl.
*H04W 72/04* (2009.01)
*H04W 80/02* (2009.01)
*H04L 5/00* (2006.01)

(52) U.S. Cl.
CPC ......... *H04W 72/042* (2013.01); *H04L 5/0005* (2013.01); *H04L 5/0094* (2013.01);
(Continued)

(58) Field of Classification Search
CPC ........... H04W 72/042; H04W 72/0453; H04W 72/0493; H04W 80/02; H04L 5/0005; H04L 5/0094
See application file for complete search history.

(56) References Cited

U.S. PATENT DOCUMENTS

2019/0356524 A1* 11/2019 Yi .................. H04B 7/0617
2021/0227515 A1* 7/2021 Takahashi ............ H04L 5/0094

OTHER PUBLICATIONS

"3rd Generation Partnership Project; Technical Specification Group Radio Access Network; NR; Multiplexing and channel coding (Release 15)", 3GPP Standard; Technical Specification; 3GPP TS 38.212, 3rd Generation Partnership Project (3GPP), Mobile Competence Centre ; (Year: 2018) 650, Route Des Lucioles ; F-06921 Sophia-Antipolis Cedex ; France, RAN WG1, V15.2.0, Jun. 29, 2018 (Jun. 29, 2018), pp. 1-98, XP051474489 (Year: 2018).*

(Continued)

*Primary Examiner* — Omar J Ghowrwal
(74) *Attorney, Agent, or Firm* — Osha Bergman Watanabe & Burton LLP

(57) ABSTRACT

A terminal is disclosed including a receiver that receives downlink control information including a field that indicates a frequency domain resource assigned to a downlink shared channel; and a processor that, when the terminal is in a connected state and information regarding an initial downlink bandwidth part (BWP) for a cell is provided via a higher layer, determines a bandwidth to use in a determination of a number of bits in the field based on a specified information included in the information regarding the initial downlink bandwidth part (BWP). In other aspects, a radio communication method, a base station, and a system are also disclosed.

10 Claims, 11 Drawing Sheets

BIT SEQUENCE AFTER CODING $d_0, d_1, d_2, ..., d_{N-1}$

PREDETERMINED LENGTH OF CIRCULAR BUFFER

BIT SEQUENCE RETRIEVED FROM CIRCULAR BUFFER ONLY BY NUMBER
OF BITS E DETERMINED BASED ON BANDWIDTH OF INITIAL BWP $e_0, e_1, e_2, ..., e_{E-1}$

(52) U.S. Cl.
CPC ... *H04W 72/0453* (2013.01); *H04W 72/0493* (2013.01); *H04W 80/02* (2013.01)

(56) References Cited

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

3GPP TSG-RAN WG2 #102; R2-1807390 "Bandwidth configuration for basic BWP operation" NTT DOCOMO, Inc., Intel Corporation; Busan, Korea; May 21-25, 2018 (3 pages).

3GPP TSG-RAN WG2 Adhoc NR#1807; R2-1810638 "Discussion on BWP operation" Huawei, HiSilicon; Montreal, Canada; Jul. 2-6, 2018 (4 pages).

3GGP TSG-RAN WG2 NR AH14807 Meeting; R2-1809625 "Discussion on the configuration of common CORESET&SearchSpace" ZTE Corporation; Montreal, Canada; Jul. 2-6, 2018 (9 pages).

International Search Report issued in International Application No. PCT/JP2019/026442, dated Aug. 20, 2019 (5 pages).

Written Opinion issued in International Application No. PCT/JP2019/026442; dated Aug. 20, 2019 (4 pages).

Extended European Search Report issued for European Application No. 19830763.9 dated Mar. 4, 2022 (9 pages).

3GPP TS 38.212 V15.2.0; "3rd Generation Partnership Project; Technical Specification Group Radio Access Network NR; Multiplexing and channel coding (Release 15)"; Jun. 2018 (98 pages).

\* cited by examiner

TERMINAL, RADIO COMMUNICATION METHOD, BASE STATION, AND SYSTEM

TECHNICAL FIELD

The present disclosure relates to a terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+(plus)," "NR (New Radio)," "NX (New radio access)," "FX (Future generation radio access)," "LTE Rel. 14," "LTE Rel. 15" (or later versions), and so on) are also under study.

In the existing LTE systems (for example, LTE Rel. 8 to Rel. 14), a user terminal (UE (User Equipment)) controls reception of a downlink shared channel (for example, PDSCH (Physical Downlink Shared Channel)), based on downlink control information (DCI) (also referred to as "downlink (DL) assignment" or the like) from a radio base station (for example, eNB (eNodeB)).

A user terminal controls transmission of an uplink shared channel (for example, PUSCH (Physical Uplink Shared Channel)), based on DCI (also referred to as "uplink (UL) grant," or the like) from the radio base station. Note that DCI is one of control signals of physical layer, and is transmitted to a user terminal by using a downlink control channel (for example, PDCCH (Physical Downlink Control Channel)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR, 5G, 5G+, Rel. 15 (or later versions)), it is assumed that the future radio communication systems use a carrier (for example, 100 to 400 MHz) of a bandwidth that is wider than a carrier (for example, up to 20 MHz) of the above-described existing LTE systems. For that purpose, it is considered to configure one or more partial bands in the carrier for a user terminal and use at least one of the one or more bands for communication. For example, a partial band in the carrier is referred to as a "bandwidth part (BWP)," or the like.

In the future radio communication systems, it is also considered to provide a BWP (also referred to as an "initial BWP," or the like) for an initial access in a carrier. In this case, how the user terminal controls at least one of reception of a downlink shared channel (for example, PDSCH (Physical Downlink Shared Channel)) and transmission of an uplink shared channel (for example, PUSCH (Physical Uplink Shared Channel)) that are assigned in the initial BWP is an issue.

The present invention has been made in view of the above, and it is therefore an object of the present invention to provide a terminal and a radio communication method, whereby at least one transmission of a downlink shared channel and an uplink shared channel that are assigned in an initial BWP can be controlled appropriately.

Solution to Problem

A terminal according to one aspect of the present disclosure includes: a receiving section that receives downlink control information including a certain field indicating a frequency domain resource assigned to a downlink shared channel; and a control section that determines the bandwidth to use for determination of a number of bits of the certain field, based on specified information included in information about an initial downlink BWP, when the terminal is in a connected state and the information about the initial downlink bandwidth part (BWP) in a cell is given by a higher layer.

Advantageous Effects of Invention

According to one aspect of the present disclosure, at least one of reception of a downlink shared channel and transmission of an uplink shared channel that are assigned in the initial BWP can be controlled appropriately.

DESCRIPTION OF EMBODIMENTS

In future radio communication systems (for example, NR, 5G, 5G+, Rel. 15 (or later versions)), it is assumed that the future radio communication systems use a carrier (for example, 100 to 400 MHz) of a bandwidth that is wider than a carrier (for example, 20 MHz) of the existing LTE systems (for example, Rel. 8 to Rel. 13). For that purpose, it is considered to configure one or more partial bands in the carrier for a user terminal and use at least one of the one or more bands for communication.

The carrier is also referred to as a "component carrier (CC)," a "cell," a "serving cell," a "system bandwidth," and so on. For example, a partial band in the carrier is referred to as a "bandwidth part (BWP)," or the like. The BWP may include a BWP for the uplink (uplink BWP) and BWP for the downlink (downlink BWP).

For example, for a user terminal, one or more BWPs (at least one of one or more uplink BWPs and one or more downlink BWPs) are configured, and at least one of the configured BWPs may be activated. The activated BWPs are also referred to as "active BWPs" or the like.

For the user terminal, a BWP for an initial access (initial BWP) may be configured. The initial BWP may include at least one of an initial BWP for the downlink (initial downlink BWP) and initial BWP for the uplink (initial uplink BWP).

In the initial access, at least one of detection of a synchronization signal, acquisition of broadcast information (for example, master information block (MIB), and establishment of a connection by random access may be performed.

The bandwidth of the initial BWP may be configured based on an index (also referred to as "pdcch-ConfigSIB1," "RMSI-PDCCH-Config," "ControlResourceSetZero," and so on) in a MIB transmitted via a broadcast channel (also referred to as "PBCH (Physical Broadcast Channel)," "P-BCH," and so on).

Figure 1:
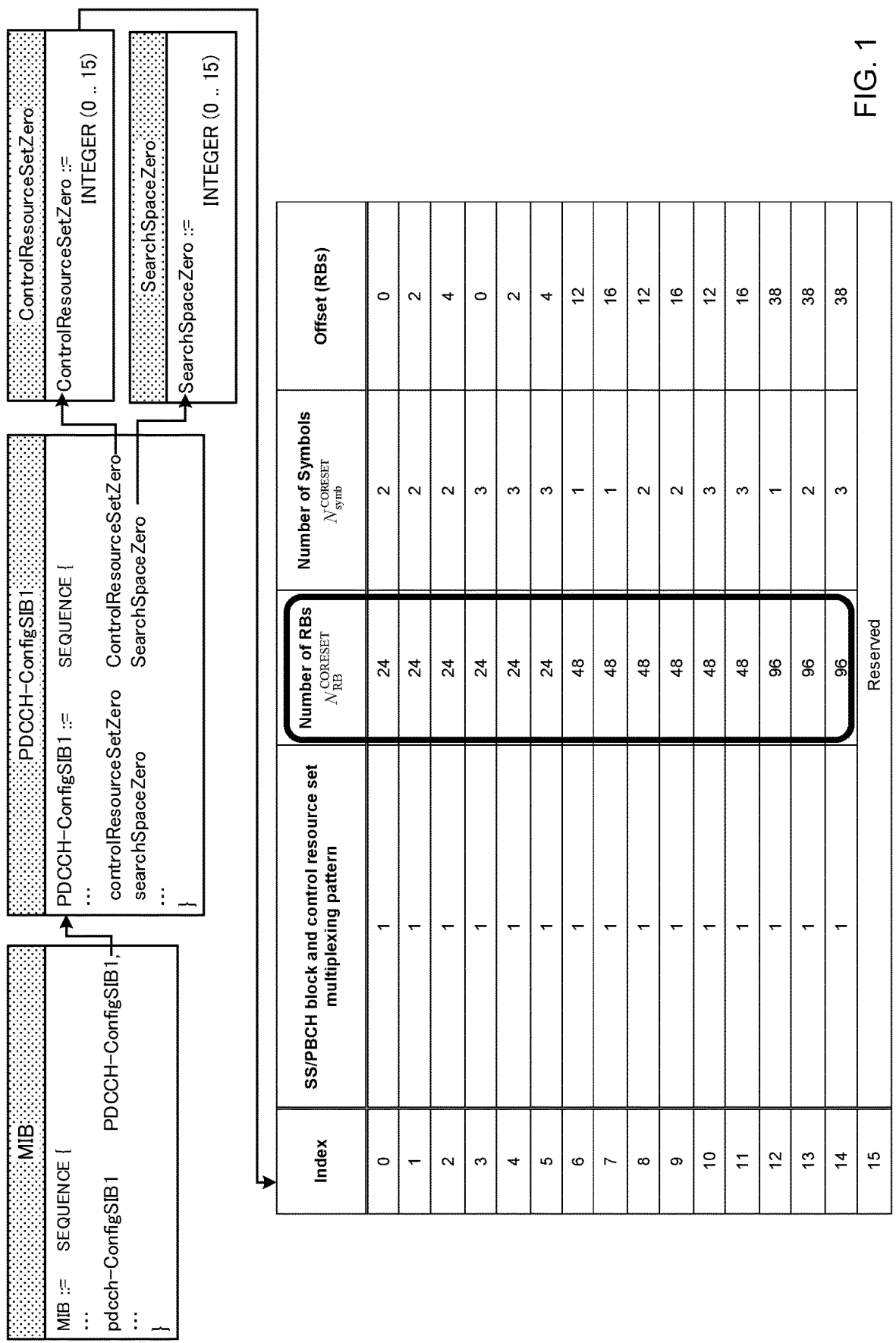
FIG. 1 is a diagram to show an example of determination of bandwidth of an initial BWP based on an MIB.

FIG. 1 is a diagram to show an example of determination of a bandwidth of an initial BWP based on an index in a MIB. As shown in FIG. 1, the MIB may include configuration information (also referred to as "pdcch-ConfigSIB1," "RMSI-PDCCH-Config," and so on) about PDCCH for system information (for example, SIB1 (System Information Block 1), RMSI (Remaining Minimum System Information)).

pdcch-ConfigSIB1 may include at least one of information (ControlResourceSetZero) about a certain control resource set (CORESET)) and information (SearchSpaceZero) about a certain search space. Here, CORESET is assignment candidate regions of a downlink control channel (for example, PDCCH (Physical Downlink Control Channel)).

For example, ControlResourceSetZero may be information (index of the certain number of bits (for example, 4 bits) associated with at least one of a bandwidth (for example, the number of resource blocks), the number of symbols, offset of CORESET #0, and so on) used for the determination of CORESET #0.

CORESET #0 is, for example, CORESET for SIB1 (or RMSI), and may be CORESET where PDCCH (or DCI) used for scheduling of a downlink shared channel (for example, PDSCH (Physical Downlink Shared Channel)) for transmitting SIB1 is mapped. CORESET #0 is also referred to as "CORESET for SIB'," "controlResourceSetZero," "common CORESET," "common CORESET #0," "cell specific CORESET," "CORESET for Type0-PDCCH common search space," and so on.

For example, SearchSpaceZero may be information (for example, an index of the certain number of bits (for example, 4 bits) associated with at least one of certain parameters M and O used for determination of a slot allocated with search space #0, the number of search space sets per slot, an index of a first symbol, and so on) used for determination of search space #0.

For example, search space #0 is CORESET for SIB1 (or RMSI), and may include candidates of a PDCCH used for scheduling of a PDSCH transmitting SIB1. Search space #0 is also referred to as a "common search space," a "Type0-PDCCH common search space," "PDCCH monitoring occasions," a "search space for SIB'," or a "search space for RMSI," and so on.

For example, in FIG. 1, the user terminal may determine the number ($N^{CORESET}_{RB}$) of resource blocks (RBs) associated with the index indicated by a certain bit (for example, MSB (Most Significant bit) 4 bits or LSB (Least Significant bit) 4 bits) of ControlResourceSetZero or pdcch-ConfigSIB1 as the bandwidth of the initial BWP. In FIG. 1, the bandwidth (the number of RBs) of the initial BWP is determined as any one of 24, 48 and 96.

Note that the values associated with indexes in FIG. 1 are only examples and are by no means limited to those illustrated. For example, each value may be changed based on at least one of a minimum channel bandwidth and a subcarrier spacing. The hierarchy structure of parameters in the MIB shown in FIG. 1 is only an example and is by no means limited to those illustrated.

The bandwidth of the initial BWP may be expressed in other words with the number of RBs (bandwidth) constituting a certain CORESET (for example, above-described CORESET #0). One or more search spaces (for example, above-described search space #0, type0-PDCCH common search space) may be associated with the certain CORESET.

As above, the bandwidth of the initial BWP determined based on an index (a certain bit (for example, 4MSB or 4LSB) of ControlResourceSetZero or pdcch-ConfigSIB1) in the MIB might be limited to three bandwidths of 24, 48, and 90. Since it can be also assumed that the user terminal supports only 1BWP depending on capability of a user terminal (UE capability), it is undesirable for the bandwidth of the initial BWP to be limited to the three bandwidths.

Thus, it is also considered to specify a bandwidth of an initial BWP, based on SIB'. Note that the user terminal monitors (blind decodes) a certain CORESET (for example, CORESET #0) determined based on an index (a certain bit (for example, 4MSB or 4LSB) of ControlResourceSetZero or pdcch-ConfigSIB1) in the MIB and detects DCI to receive SIB' by using a PDSCH scheduled by the DCI. The user terminal may monitor (blind decode) a search space (for example, search space #0) determined based on an index (a certain bit (for example, 4MSB or 4LSB) of SearchSpaceZero or pdcch-ConfigSIB1) in the MIB to detect the DCI.

Figure 2:
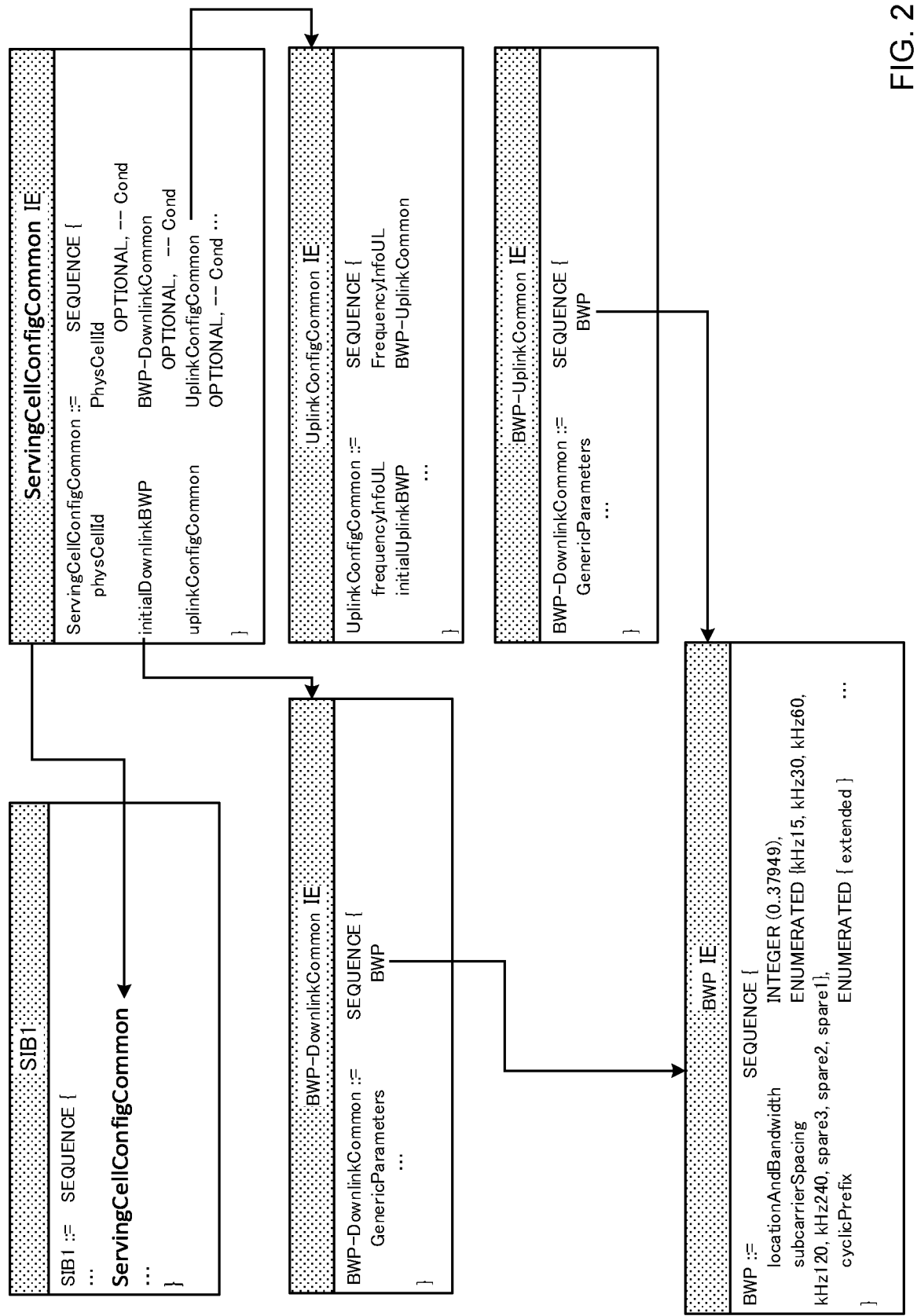
FIG. 2 is a diagram to show an example of determination of bandwidth of the initial BWP based on SIB1.

FIG. 2 is a diagram to show an example of determination of bandwidth of the initial BWP based on SIB1. As shown in FIG. 2, SIB1 may include information (also referred to as "bandwidth/location information," "specified information," and so on, for example, "locationAndBandwidth") used for at least one determination of a bandwidth of an initial BWP and a frequency domain location. locationAndBandwidth may be constituted by the certain number of bits (for example, 15 bits).

The user terminal may determine a bandwidth (the number of RBs) of an initial BWP, based on at least one bit of locationAndBandwidth. For example, the user terminal may determine the number of RBs associated with an index indicated by at least one bit of locationAndBandwidth in a table which at least associates the number of RBs with a certain index, as the bandwidth of the initial BWP.

The user terminal may determine a location of a frequency domain of an initial BWP, based on at least one bit of locationAndBandwidth. The location of the frequency domain may be indicated by a distance (the number of RBs) from the lowest subcarrier (point A) of the resource block (also referred to as a "reference resource block," "common RB0," and so on) which is used as the reference in the carrier. The user terminal may determine the location of the frequency domain of the above-described initial BWP, based on the above-described distance specified by at least one bit of locationAndBandwidth.

As shown in FIG. 2, SIB1 may include configuration information of cell specific parameters (for example, ServingCellConfigCommon). ServingCellConfigCommon may include information (for example, initialDownlinkBWP) about an initial downlink BWP. For initialDownlinkBWP, cell specific common parameters (BWP-DownlinkCommon) may be provided. BWP-DownlinkCommon may include the above-mentioned locationAndBandwidth, or the like.

The user terminal may determine at least one of the bandwidth of the initial downlink BWP and the location of the frequency domain, based on locationAndBandwidth in BWP-DownlinkCommon provided for initialDownlinkBWP.

ServingCellConfigCommon may include uplink common configuration information (for example, UplinkConfigCommon). UplinkConfigCommon may include information (for example, initialUplinkBWP) about an initial uplink BWP. For initialUplinkBWP, cell specific common parameters (for example, BWP-UplinkCommon) may be provided. BWP-UplinkCommon may include the above-mentioned locationAndBandwidth, or the like.

The user terminal may determine at least one of the bandwidth of the initial downlink BWP and the location of the frequency domain, based on locationAndBandwidth in BWP-UplinkCommon provided for initialUplinkBWP.

Note that hierarchy structure of the parameters shown in FIG. 2 is only an example, and is by no means limited to those illustrated. For example, although, in FIG. 2, information (for example, BWP-DownlinkCommon given for initialDownlinkBWP) about an initial downlink BWP is included in ServingCellConfigCommon, information about the initial downlink BWP may be included in any IE (Information Element) of any hierarchy in SIB1'. Although bandwidth/location information (for example, locationAndBandwidth) of an initial downlink BWP is included in BWP-DownlinkCommon given for initialDownlinkBWP, bandwidth/location information of the initial downlink BWP may be included in any IE of any hierarchy.

Although information (for example, BWP-UplinkCommon given for initialUplinkBWP) about an initial uplink BWP is included in UplinkConfigCommon in ServingCellConfigCommon, information about the initial uplink BWP may be included in any IE of any hierarchy in SIB1. Although bandwidth/location information (for example, locationAndBandwidth) of an initial uplink BWP is included in BWP-UplinkCommon given for initialUplinkBWP, bandwidth/location information of the initial uplink BWP may be included in any IE of any hierarchy.

At least one (initial downlink BWP/initial uplink BWP) bandwidth of an initial downlink BWP and an initial uplink BWP determined based on bandwidth/location information (for example, locationAndBandwidth) in above SIB1 may be a bandwidth wider than a bandwidth (for example, 24, 48, or 96 RBs) determined based on an index in the MIB.

When the user terminal receives SIB1 including bandwidth/location information (for example, locationAndBandwidth) of an initial downlink BWP/initial uplink BWP, the user terminal may apply a bandwidth determined based on the bandwidth/location information to the initial downlink BWP/initial uplink BWP. On the other hand, when the user terminal does not receive SIB1 including bandwidth/location information (for example, locationAndBandwidth) of the initial downlink BWP/initial uplink BWP, the user terminal may apply a bandwidth determined based on an index in the MIB to the initial downlink BWP/initial uplink BWP.

In this manner, when information (for example, at least one of BWP-DownlinkCommon for initialDownlinkBWP and BWP-UplinkCommon for initialUplinkBWP) about an initial BWP is included in SIB1, both a value based on an index in the MIB and a value based on bandwidth/location information in SIB1 can exist for a bandwidth of the initial BWP (initial downlink BWP/initial uplink BWP).

In this case, the user terminal may not appropriately control at least one of reception of a PDSCH and transmission of a PUSCH in an initial downlink BWP/initial uplink BWP. Note that a similar problem can occur, for example, not only when information about an initial BWP is included in above-described SIB1, but also when information about an initial BWP is included in a radio resource control (RRC) message.

For example, in the above-described future radio communication systems, it is assumed that frequency domain resources assigned to a PDSCH in an initial downlink BWP is specified by a certain field (for example, Frequency domain resource assignment) in the DCI (DL assignment, DCI Format 1_0 or 1_1). It is assumed that the number of bits of the certain field is determined based on a bandwidth of an initial downlink BWP.

Similarly, in the above-described future radio communication systems, it is assumed that frequency domain resources assigned to a PUSCH in an initial uplink BWP is specified by a certain field (for example, Frequency domain resource assignment) in the DCI (UL grant, DCI format 0_0 or 0_1). It is assumed that the number of bits of the certain field is determined based on a bandwidth of an initial uplink BWP.

However, as mentioned above, when a plurality of values (for example, a value based on an index in the MIB and a value based on bandwidth/location information in SIB1) is assumed for a bandwidth of an initial downlink BWP/initial uplink BWP, the number of bits of the certain field in the above-described DCI may not be determined appropriately.

In the above-described future radio communication systems, it is assumed that a bandwidth of an initial downlink BWP/initial uplink BWP is also used for bit selection in rate matching (for example, rate matching for a low-density parity-check code (LDCP)). Therefore, when the plurality of values described above are assumed as a bandwidth of an initial downlink BWP/initial uplink BWP, bit selection in rate matching may not appropriately controlled.

Thus, it is considered to control reception of a PDSCH and transmission of a PUSCH in an initial downlink BWP/initial uplink BWP, based on whether information (for example, at least one of BWP-DownlinkCommon for initialDownlinkBWP and BWP-UplinkCommon for initialUplinkBWP) about an initial BWP is given by the higher layers or not.

However, for example, for a state of the user terminal (UE state) in the above-described future radio communication systems, a connected state (RRC CONNECTED), an inactive state (RRC INACTIVE), and an idle state (RRC IDLE) are assumed.

For example, the connected state (RRC CONNECTED) is a state where the user terminal establishes an RRC connection with a network (for example, radio base station (for example, gNB (gNodeB))). In the connected state, the user terminal may monitor a control channel (for example, PDCCH) associated with a shared channel (for example, PDSCH or PDCCH), provide the radio base station with channel quality and feedback information, perform measurements on neighbouring cells and report the measurement results to the radio base station, acquire system information, and so on.

The inactive state (RRC INACTIVE) is, for example, a state where the user terminal establishes an RRC connection with the above-described network, but the operations performed by the user terminal are more limited than the connected state. In the inactive state, the user terminal may perform user terminal specific discontinuous reception (DRX) configured by upper layers or the RRC layer. The user terminal does not need to monitor a control channel.

For example, the idle state (RRC IDLE) is a state where the user terminal does not establish an RRC connection with the above-described network. In the idle state, the user terminal may perform user terminal specific DRX configured by the upper layers. The user terminal does not need to monitor a control channel.

Thus, in the above-described future radio communication systems, since it is assumed that operations permitted by the user terminal vary in the plurality of states, reception of a PDSCH and transmission of a PUSCH in an initial downlink BWP/initial uplink BWP may not be appropriately controlled when not considering the state of the user terminal.

Then, the innovators of the present invention came up with the idea of controlling, based on at least the state of the user terminal (for example, whether the user terminal is in the connected state or not), determination of a bandwidth of an initial downlink BWP/initial uplink BW, based on either an index in the MIB or bandwidth/location information in SIB'. Thereby, at least one of reception of a PDSCH and transmission of a PUSCH in an initial downlink BWP/initial uplink BWP can be controlled appropriately.

The present embodiment is described in detail with reference to the drawings as follows.

In the present embodiment, "whether information about an initial BWP is given by the higher layers or not" may be expressed in other words with "whether information about an initial BWP is included in at least one of SIB' and RRC messages or not." The RRC message may be transmitted with at least one of a handover procedure, an additional procedure of a primary secondary cell (PSCell) in dual connectivity (DC), and an addition procedure of a secondary cell (SCell) in DC or carrier aggregation (CA).

If the RRC message is transmitted by the handover procedure, the information about the initial BWP may be information about an initial BWP in the cell of a handover destination (target cell). If the RRC message is transmitted by the additional procedure of a PSCell or a SCell, the information about the initial BWP may be information about an initial BWP in a PSCell or a SCell added.

In the following, "the information about the initial BWP" may be at least one of BWP-DownlinkCommon for initialDownlinkBWP and BWP-UplinkCommon for initialUplinkBWP, but is by no means limited to this. The "information about the initial BWP" may be any information as long as it is information including at least one of bandwidth/location information of an initial downlink BWP and bandwidth/location information of an initial uplink BWP.

(First Aspect)

In a first aspect, the user terminal may determine the number of bits of a certain field indicating frequency domain resources assigned to a PDSCH or PUSCH in DCI, based on whether the state of the user terminal is the connected state (RRC CONNECTED) or not. The number of bits may be determined based on whether information (for example, BWP-DownlinkCommon for initialDownlinkBWP or BWP-UplinkCommon for initialUplinkBWP) about an initial BWP (band for the initial access) is provided by the higher layers or not.

In the following, the certain field is referred to as a "frequency domain resource assignment field (frequency domain resource assignment)," but the name of the certain field is by no means limited to this. The first aspect may be used alone or may be combined with other aspects. The control in the first aspect may be performed by not only the user terminal (for example, UE) but also the radio base station (for example, eNB, gNB (gNodeB), TRP (Transmission Reception Point)).

In the first aspect, if the user terminal is in the connected state and the information about the above-described initial BWP is given by the higher layers, the number of bits of the frequency domain resource assignment field in the DCI may be determined based on the bandwidth given by specified information (for example, locationAndBandwidth) in the information about the above-described initial BWP.

On the other hand, in cases except the above (in other words, if the user terminal is not in the connected state (if the user terminal is in the inactive state or the idle state) or if the information about the above-described initial BWP is not given by the higher layers), the user terminal may determine the number of bits of the frequency domain resource assignment field in the DCI, based on the bandwidth given by an index (a certain bit of controlResourceSetZero or pdcch-ConfigSIB1, and so on) via a PBCH.

Here, the DCI including the frequency domain resource assignment field may be DCI (DL assignment) used for scheduling of a PDSCH, or may be DCI (UL grant) used for scheduling of a PUSCH.

(Control of Number of Bits of Frequency Domain Resource Assignment Field in DL Assignment)

Figure 3:
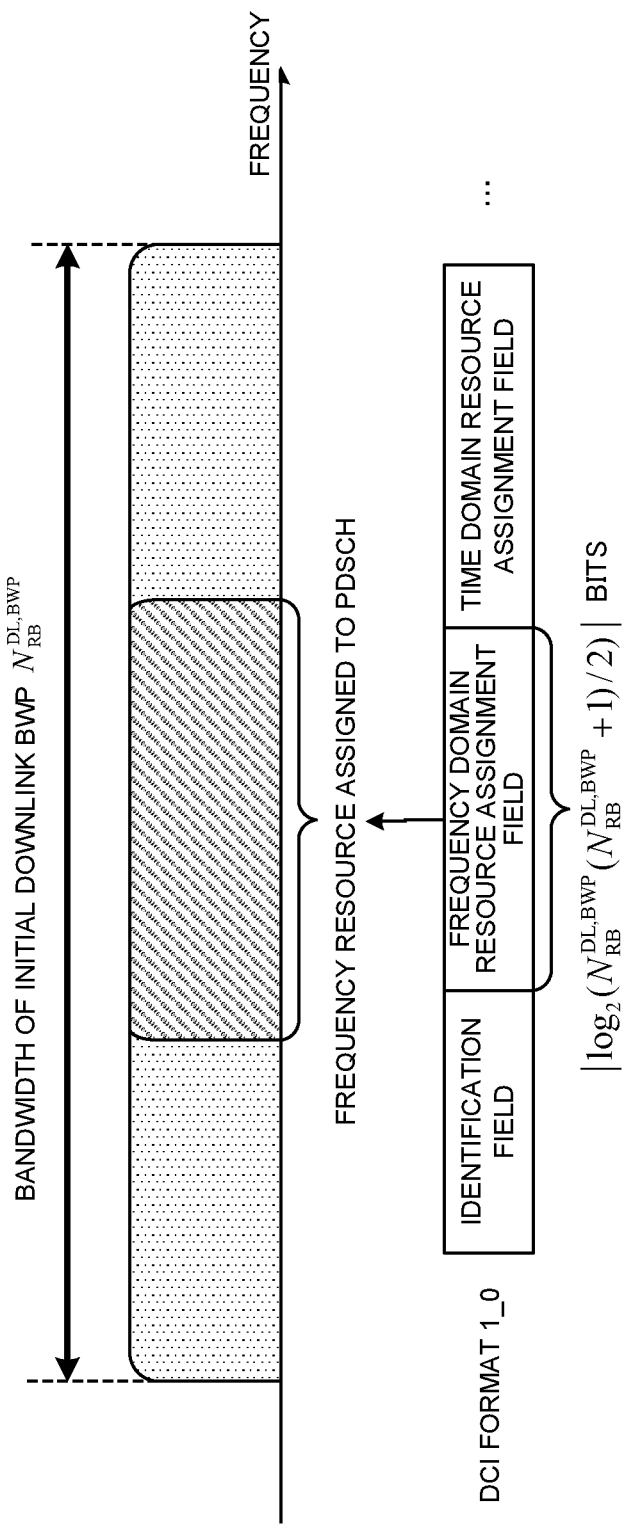
FIG. 3 is a diagram to show an example of determination of the number of bits of a frequency domain resource assignment field in a DL assignment according to a first aspect.

FIG. 3 is a diagram to show an example of determination of the number of bits of the frequency domain resource assignment field in the DL assignment according to the first aspect. The DL assignment may include at least one of DCI format 1_0 and DCI format 1_1. FIG. 3 indicates DCI format 1_0 as an example of the DL assignment, but it may be any DCI used for scheduling of a PDSCH.

DCI format 1_0 in FIG. 3 may be CRC-scrambled with a certain identifier. For example, the certain identifier may be at least one of C-RNTI (Cell-Radio Network Temporary Identifier), P-RNTI (paging-RNTI), SI-RNTI (System Information-RNTI), RA-RNTI (Random Access-RNTI) and TC-RNTI (Temporary Cell-RNTI).

As shown in FIG. 3, the frequency resource assigned to a PDSCH in the bandwidth $N_{RB}^{DL,BWP}$ of the initial downlink BWP is specified by the frequency domain resource assignment field of DCI format 1_0.

Note that the frequency resource assignment to a PDSCH in FIG. 3 is only an example, and discontinuous frequency resources may be assigned to the PDSCH. A unit of frequency resource assignment may be an RB, or may be a resource block group (RB) including one or more RBs.

As shown in FIG. 3, the number of bits of the frequency domain resource assignment field may be determined based on the bandwidth $N_{RB}^{DL,BWP}$ of the initial downlink BWP. For example, in FIG. 3, the number of bits is determined based on Formula 1 described below.

$$\lceil \log_2(N_{RB}^{DL,BWP}(N_{RB}^{DL,BWP}+1)/2) \rceil \quad \text{Formula 1}$$

Here, if the user terminal is in the connected state and BWP-DownlinkCommon for initialDownlinkBWP (information about a band for an initial access) is given by the higher layers, $N_{RB}^{DL,BWP}$ in Formula (1) may be a bandwidth given by locationAndBandwidth of the above-described BWP-DownlinkCommon (specified information). Note that determination of a bandwidth based on at least one bit constituting locationAndBandwidth is as above.

On the other hand, if the user terminal is not in the connected state (if the user terminal is in the inactive state or in the idle state) or if BWP-DownlinkCommon for initialDownlinkBWP is not given by the higher layers, $N_{RB}^{DL,BWP}$ in Formula (1) may be a bandwidth given by an index (a certain bit of controlResourceSetZero or pdcch-ConfigSIB1, or the like) in the MIB transmitted via a PBCH. Note that determination of a bandwidth based on at least one bit constituting an index in the MIB is as above.

Thus, if the user terminal is in the connected state and BWP-DownlinkCommon for initialDownlinkBWP is given by the higher layers, the number of bits of the frequency domain resource assignment field in the DL assignment may be determined based on a bandwidth given by locationAndBandwidth of the BWP-DownlinkCommon.

If the user terminal is not in the connected state (if the user terminal is in the inactive state or in the idle state) or if BWP-DownlinkCommon for initialDownlinkBWP is not given by the higher layers, the number of bits of the frequency domain resource assignment field in the DL assignment may be determined based on a bandwidth given by an index (a certain bit of controlResourceSetZero or pdcch-ConfigSIB1, and so on) via a PBCH.

Note that "BWP-DownlinkCommon for initialDownlinkBWP is given by the higher layers" may be expressed in other words with a case where at least one of SIB1 and the RRC message includes BWP-DownlinkCommon for initialDownlinkBWP. For example, the hierarchy structure of BWP-DownlinkCommon in SIB1 is exemplified in FIG. 2, but it is by no means limited to this. The RRC message may be an RRC message (for example, RRC Reconfiguration message) transmitted with at least one of a handover procedure, an additional procedure of a PSCell, and an additional procedure of a SCell.

Above Formula 1 is only an example, and the number of bits of the frequency domain resource assignment field may be determined using any formula except above Formula 1. For example, if DCI format 1_0 CRC-scrambled with the P-RNTI transmits a short message, the number of bits of the frequency domain resource assignment field may be determined based on Formula 2 described below.

$$[\lceil \log_2(N_{RB}^{DL,BWP}(N_{RB}^{DL,BWP}+1)/2) \rceil +19] \quad \text{Formula 2}$$

(Control of Bit Number of Frequency Domain Resource Assignment Field in UL Grant)

Figure 4:
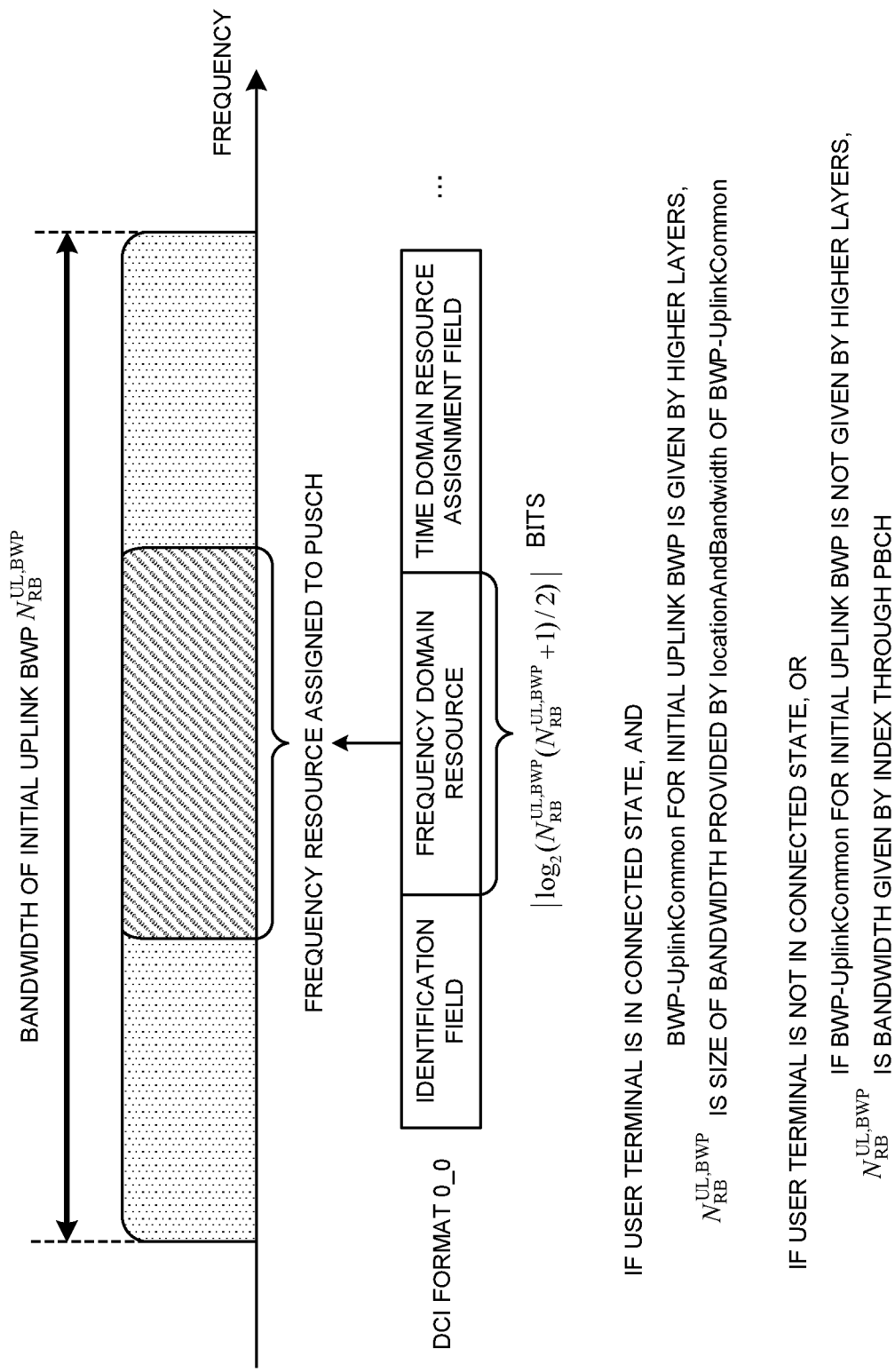
FIG. 4 is a diagram to show an example of determination of the number of bits of a frequency domain resource assignment field in a UL grant according to the first aspect.

FIG. 4 is a diagram to show an example of determination of the number of bits of a frequency domain resource assignment field in a UL grant according to the first aspect. The UL grant may include at least one of DCI format 0_0 and DCI format 0_1. FIG. 4 indicates DCI format 0_0 as an example of the UL grant, but it may be any DCI used for scheduling of a PUSCH.

DCI format 0_0 in FIG. 4 may be CRC-scrambled with a certain identifier. For example, the certain identifier may be at least one of C-RNTI and TC-RNTI.

As shown in FIG. 4, the frequency resource assigned to a PUSCH in the bandwidth $N_{RB}^{UL,BWP}$ of the initial uplink BWP is specified by the frequency domain resource assignment field of DCI format 0_0.

Note that the frequency resource assignment to a PUSCH in FIG. 4 is only an example, and discontinuous frequency resources may be assigned to the PUSCH. A unit of frequency resource assignment may be an RB, or may be a resource block group (RB) including one or more RBs.

As shown in FIG. 4, the number of bits of the frequency domain resource assignment field may be determined based on the bandwidth $N_{RB}^{UL,BWP}$ of the initial uplink BWP. For example, in FIG. 4, the number of bits is determined based on Formula 3 described below.

$$\lceil \log_2(N_{RB}^{UL,BWP}(N_{RB}^{UL,BWP}+1)/2) \rceil \quad \text{Formula 3}$$

Here, if the user terminal is in the connected state and BWP-UplinkCommon for initialUpinkBWP (information about a band for an initial access) is given by the higher layers, $N_{RB}^{UL,BWP}$ in Formula (3) may be a bandwidth given by locationAndBandwidth of the above-described BWP-UplinkCommon (specified information). Note that determination of a bandwidth based on at least one bit constituting locationAndBandwidth is as above.

On the other hand, if the user terminal is not in the connected state (if the user terminal is in the inactive state or in the idle state) or if BWP-UplinkCommon for initialUplinkBWP is not given by the higher layers, $N_{RB}^{UL,BWP}$ in Formula (3) may be a bandwidth given by an index (a certain bit of controlResourceSetZero or pdcch-ConfigSIB1, or the like) in the MIB transmitted via a PBCH. Note that determination of a bandwidth based on at least one bit constituting an index in the MIB is as above.

Thus, if the user terminal is in the connected state and BWP-UplinkCommon for initialUplinkBWP is given by the higher layers, the number of bits of the frequency domain resource assignment field in the UL grant may be determined based on a bandwidth given by locationAndBandwidth of the BWP-UplinkCommon.

If the user terminal is not in the connected state (if the user terminal is in the inactive state or in the idle state) or if BWP-UplinkCommon for initialUplinkBWP is not given by the higher layers, the number of bits of the frequency domain resource assignment field in the UL grant may be determined based on a bandwidth given by an index (a certain bit of controlResourceSetZero or pdcch-ConfigSIB1, and so on) via a PBCH.

Note that "BWP-UplinkCommon for initialUplinkBWP is given by the higher layers" may be expressed in other words with a case where at least one of SIB1 and the RRC message includes BWP-UplinkCommon for initialUplinkBWP. For example, the hierarchy structure of BWP-UplinkCommon in SIB1 is exemplified in FIG. 2, but it is by no means limited to this. The RRC message may be an RRC message (for example, RRC Reconfiguration message) transmitted with at least one of a handover procedure, an additional procedure of a PSCell, and an additional procedure of a SCell.

Above Formula 3 is only an example, and the number of bits of the frequency domain resource assignment field may be determined using any formula except above Formula 3.

As above, in the first aspect, based on whether at least the user terminal is in the connected state or not, it is controlled that a bandwidth of an initial downlink BWP/initial uplink BW is determined based on which information about an index in the MIB or an initial BWP in SIB1, and the number of bits of the frequency domain resource assignment field in the DCI is determined based on the bandwidth. Thus, the user terminal can appropriately control reception of a PDSCH or transmission of a PUSCH assigned by the initial BWP by the DCI.

(Second Aspect)

In a second aspect, the user terminal the user terminal may control bit selection in rate matching of a PDSCH or a PUSCH, based on whether the state of the user terminal is in the connected state (RRC CONNECTED) or not. The bit selection may be controlled based on whether information (for example, BWP-DownlinkCommon for initialDownlinkBWP or BWP-UplinkCommon for initialUplinkBWP) about an initial BWP (band for the initial access) is provided by the higher layers or not.

In the second aspect, differences from the first aspect will be mainly described. The second aspect may be used alone or may be combined with other aspects. The control in the second aspect may be performed in the radio base station.

In the second aspect, if the user terminal is in the connected state and the information about the above-described initial BWP is given by the higher layers, the bit selection in rate matching of a PDSCH or a PUSCH may be controlled based on the bandwidth given by specified information (for example, locationAndBandwidth) in the information about the above-described initial BWP.

On the other hand, in cases except the above (in other words, if the user terminal is not in the connected state (if the user terminal is in the inactive state or the idle state) or if the information about the above-described initial BWP is not given by the higher layers), the user terminal may control bit selection in rate matching of a PDSCH or a PUSCH, based on the bandwidth given by an index (a certain bit of controlResourceSetZero or pdcch-ConfigSIB1, and so on) via a PBCH.

Here, the bit selection in rate matching may refer to selecting a certain number of bits (for example, continuous bits) that corresponds to resource (for example, the number of resource elements (Res) available in one or more RBs assigned to a PDSCH or a PUSCH) assigned for transmission, from a certain length of circular buffer stored in a bit sequence after coding.

Note that, for example, the above-described rate matching may be rate matching for an LDCP.

Figure 5:
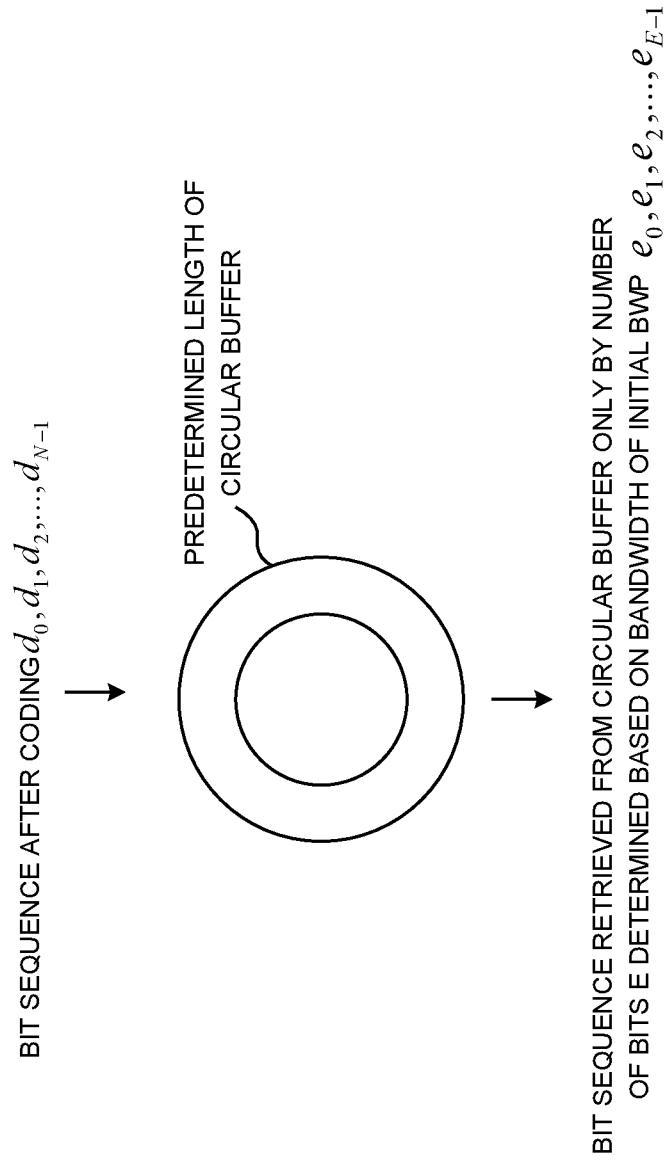
FIG. 5 is a diagram to show an example of control of bit selection in rate matching according to a second aspect.

FIG. 5 is a diagram to show an example of control of bit selection in rate matching according to the second aspect. Note that the bit selection in rate matching exemplified in FIG. 5 may be also applied to rate matching of data (also referred to as a "transport block," a "code block," and so on) transmitted in either a PDSCH and a PUSCH assigned to an initial BWP.

As shown in FIG. 5, a bit sequence of the number of bits N after coding (for example, output bits from an encoder of a LDCP) $d_0, d_1, \ldots, d_{N-1}$ are written into a certain length of circular buffer. The number of bits E retrieved from the circular buffer may be determined based on a bandwidth of an initial BWP.

(Bit Selection of Rate Matching of DL-SCH)

The bit selection in rate matching of a DL-SCH (Downlink shared channel) which is a transport channel mapped to a PDSCH will be described in detail.

In the bit selection in the rate matching of a DL-SCH, if the user terminal is in the connected state and BWP-DownlinkCommon for initialDownlinkBWP (information about a band for the initial access) is given by the higher layers, the number of bits E retrieved from the circular buffer in FIG. 5 may be determined based on a bandwidth given by locationAndBandwidth (specified information) of the above-described BWP-DownlinkCommon.

On the other hand, if the user terminal is not in the connected state (if the user terminal is in the inactive state or in the idle state) or if BWP-DownlinkCommon for initialDownlinkBWP is not given by the higher layers, the number of bits E retrieved from the circular buffer in FIG. 5 may be determined based on a bandwidth given by an index (a certain bit of controlResourceSetZero or pdcch-ConfigSIB1, or the like) in the MIB transmitted via a PBCH.

(Bit Selection of Rate Matching of UL-SCH)

The bit selection in rate matching of a UL-SCH (Uplink shared channel) which is a transport channel mapped to a PUSCH will be described in detail.

In the bit selection in the rate matching of a UL-SCH, if the user terminal is in the connected state and BWP-UplinkCommon for initialUplinkBWP (information about a band for the initial access) is given by the higher layers, the number of bits E retrieved from the circular buffer in FIG. 5 may be determined based on a bandwidth given by locationAndBandwidth (specified information) of the above-described BWP-UplinkCommon.

On the other hand, if the user terminal is not in the connected state (if the user terminal is in the inactive state or in the idle state) or if BWP-UplinkCommon for initialUplinkBWP is not given by the higher layers, the number of bits E retrieved from the circular buffer in FIG. 5 may be determined based on a bandwidth given by an index (a certain bit of controlResourceSetZero or pdcch-ConfigSIB1, or the like) in the MIB transmitted via a PBCH.

As above, in the second aspect, based on whether at least the user terminal is in the connected state or not, it is controlled that a initial downlink BWP/initial uplink BW is determined based on which information about an index in the MIB or an initial BWP in SIB1, and the number of bits E retrieved from the circular buffer in the rate matching of a PDSCH or a PUSCH is determined based on the bandwidth. Thus, the user terminal can appropriately control the rate matching of a PDSCH or PUSCH assigned to an initial BWP.

(Other Aspects)

Examples to control the number of bits of the frequency domain resource assignment field in the above described DCI (the first aspect), the bit selection (the second aspect) in the rate matching, based on whether the user terminal is in the connected state or not, have been described above.

However, the "control of reception of a PDSCH or transmission of a PUSCH" based on whether the user terminal is in the connected state or not is by no means limited to the controls described in the above-described first aspect and the second aspect, and may be any control related to transmission and reception of a PDSCH or a PUSCH.

For example, if a bandwidth ($N_{BWP}^{size}$) of an initial BWP is considered at determination of the frequency resource by the frequency domain resource assignment field in the DCI, the bandwidth may be determined in the same condition as that of the first aspect and that of the second aspect.

(Radio Communication System)

Now, the structure of a radio communication system according to the present embodiment will be described below. In this radio communication system, the radio communication method according to each embodiment of the present disclosure described above may be used alone or may be used in combination for communication.

Figure 6:
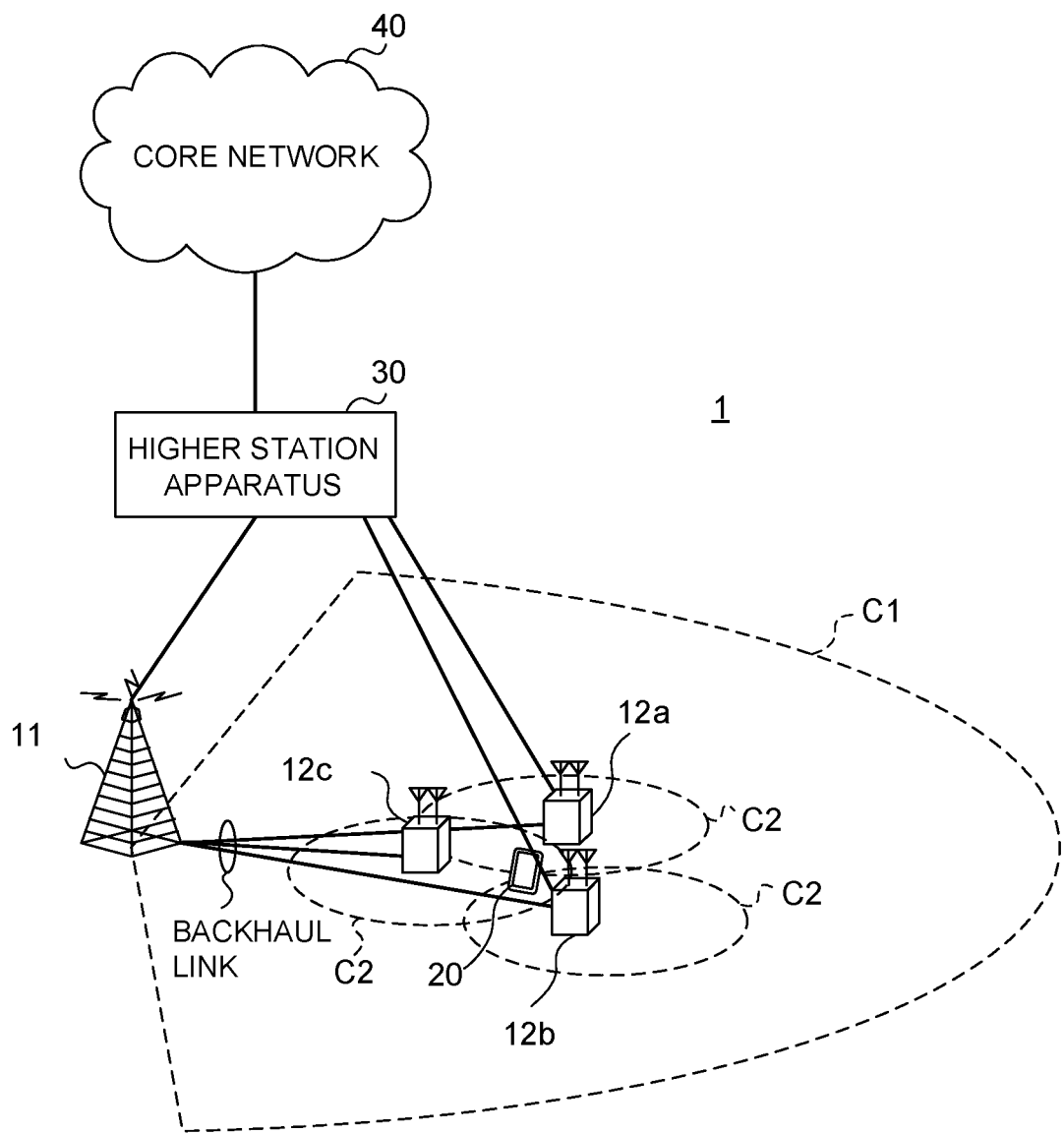
FIG. 6 is a diagram to show an example of a schematic structure of a radio communication system according to the present embodiment.

FIG. 6 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where a system bandwidth of an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. User terminals 20 are placed in the macro cell C1 and each small cell C2. The arrangement, the number, or the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz. 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a wireless frame construction, a particular filter processing performed by a transceiver in a frequency domain, a particular windowing processing performed by a transceiver in a time domain, and so on. For example, for a certain physical channel, if the subcarrier spacing of the OFDM symbols constituted is different and/or if the number of the OFDM symbols is different, it may be referred to as that the numerologies are different.

A wired connection (for example, means in compliance with the CPRI (Common Public Radio Interface) such as optical fiber, the X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, OFDMA (orthogonal Frequency Division Multiple Access) can be applied to the downlink, and SC-FDMA (Single-Carrier Frequency Division Multiple Access) and/or OFDMA can be applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, and SIBs (System Information Blocks) are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel, which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, SR (Scheduling Request), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 7:
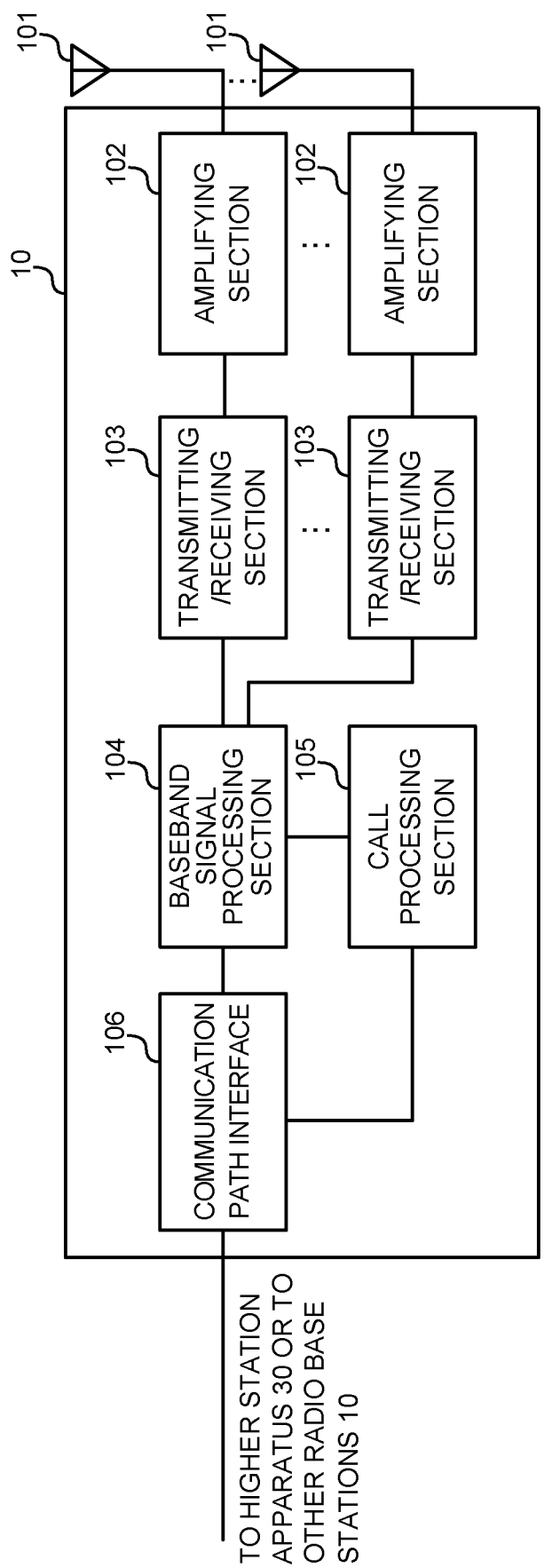
FIG. 7 is a diagram to show an example of an overall structure of a radio base station according to the present embodiment.

FIG. 7 is a diagram to show an example of an overall structure of a radio base station according to the present embodiment. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 converts the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing) for communication channels. manages the state of the radio base station 10 and manages the radio resources.

The communication path interface 106 transmits and/or receives signals to and/or from the higher station apparatus 30 via a certain interface. The communication path interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 transmit a DL signal (for example, at least one of a PDCCH (DCI), a PDSCH (DL data, higher layer control information), a DL reference signal). The transmitting/receiving sections 103 receive a UL signal (for example, at least one of a PUCCH (UCI), a PUSCH (UL data, higher layer control information, UCI), a UL reference signal).

The transmitting/receiving sections 103 transmit downlink control information including a certain field indicating a frequency domain resource assigned to the PDSCH or the PUSCH. The transmitting/receiving sections 103 may transmit the MIB via the PBCH. The transmitting/receiving sections 103 may transmit at least one of SIB1 and the RRC message.

Figure 8:
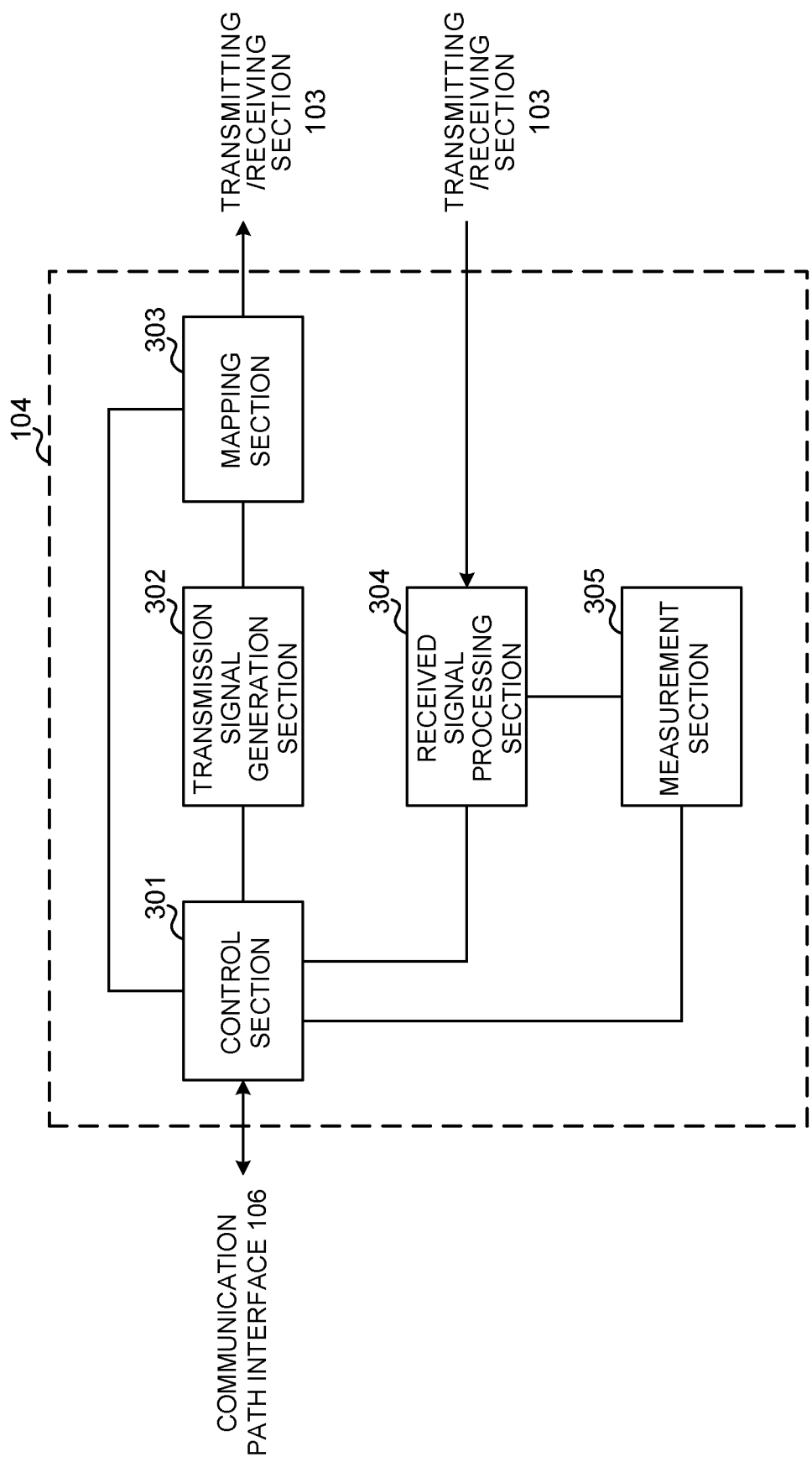
FIG. 8 is a diagram to show an example of a functional structure of the radio base station according to the present embodiment.

FIG. 8 is a diagram to show an example of a functional structure of a radio base station according to the present embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted in the PDSCH), a downlink control signal (for example, a signal transmitted on the PDCCH and/or the EPDCCH. transmission confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH. transmission confirmation information, and so on), a random access preamble (for example, a signal transmitted on the PRACH), an uplink reference signal, and so on.

The control section 301 may control at least one of generation and transmission of the downlink control information including a certain field (for example, a frequency domain assignment field) indicating a frequency domain resource assigned to the PDSCH or the PUSCH.

The control section 301 may control transmission of a PDSCH or reception of a PUSCH. Specifically, the control section 301 may control transmission of a PDSCH or reception of a PUSCH, based on whether the state of the user terminal is the connected state or not. The control section 301 may control transmission of a PDSCH or reception of a PUSCH, based on whether information about an initial BWP (band for the initial access) in the carrier is given by the higher layers or not.

The control section 301 may control determination of the bandwidth of the initial BWP, based on at least one of whether the state of the user terminal is the connected state or not, and whether information about the initial BWP (band for the initial access) in the carrier is given by the higher layers or not.

For example, if the state of the user terminal 20 is the connected state and the information about the initial BWP is given by the higher layers, the control section 301 may determine the number of bits of the certain field, based on the bandwidth given by specified information in the information about the initial BWP (the first aspect).

On the other hand, if the state of the user terminal 20 is not the connected state, or if the information about the initial BWP is not given by the higher layers, the control section 301 may determine the number of bits of the certain field, based on the bandwidth given by the index (index in the MIB) transmitted via the PBCH (the first aspect).

If the state of the user terminal 20 is the connected state and the information about the initial BWP is given by the higher layers, the control section 301 may control the bit selection in the rate matching of the PDSCH or the PUSCH, based on the bandwidth given by specified information in the information about the initial BWP (the second aspect).

If the state of the user terminal 20 is not the connected state, or if the information about the initial BWP is not given by the higher layers, the control section 301 may control the bit selection in the rate matching of the PDSCH or the PUSCH, based on the bandwidth given by the index (index in the MIB) transmitted via the PBCH (the second aspect).

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generating circuit or signal generating apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follows the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor. a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301.

The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

(User Terminal)

Figure 9:
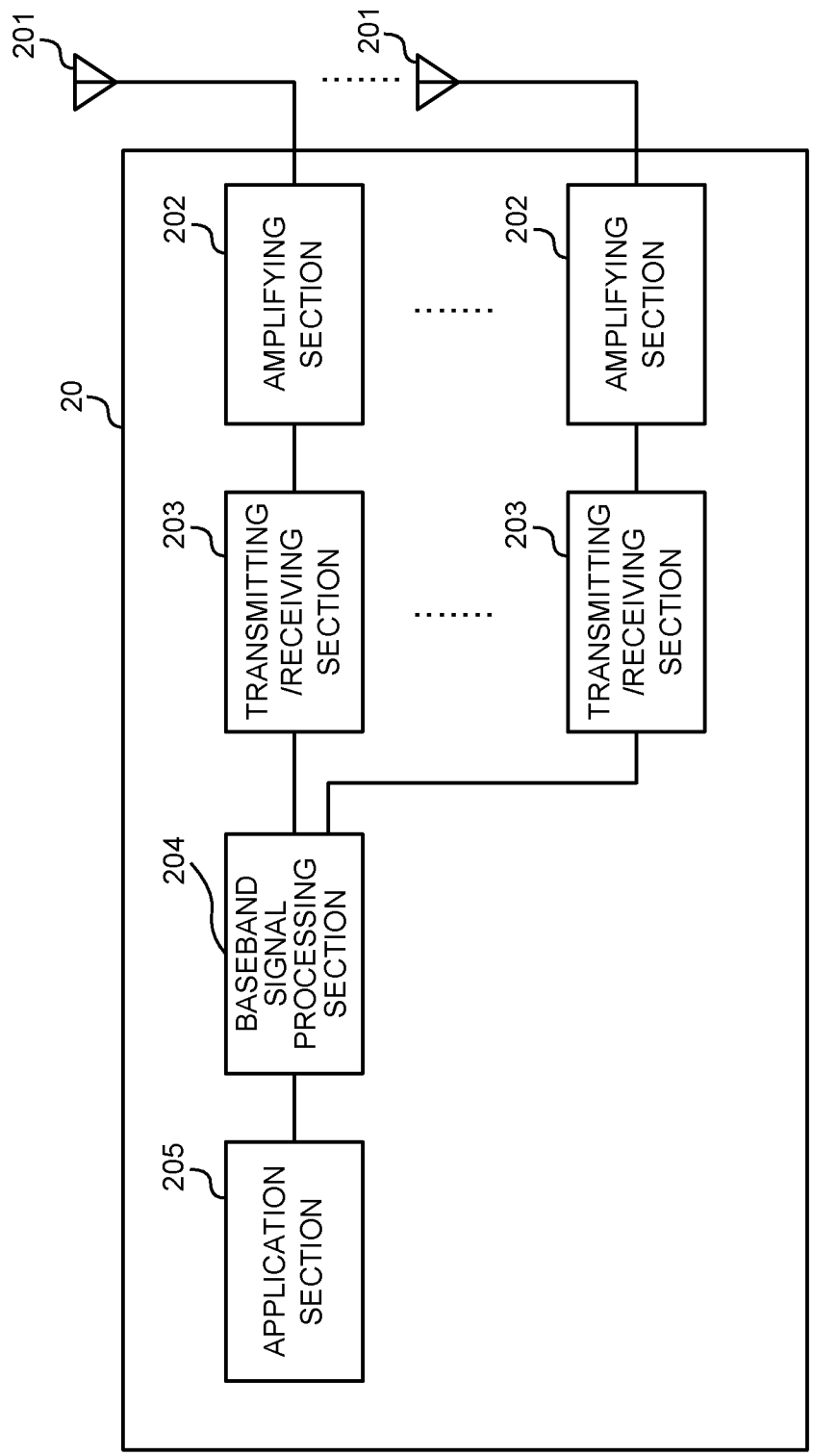
FIG. 9 is a diagram to show an example of an overall structure of a user terminal according to the present embodiment.

FIG. 9 is a diagram to show an example of an overall structure of a user terminal according to the present embodiment. A user terminal 20 includes a plurality of transmitting/receiving antennas 201, amplifying sections 202, transmitting/receiving sections 203. a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 converts the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process). channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 receive a DL signal (for example, at least one of a PDCCH (DCI), a PDSCH (DL data, higher layer control information), a DL reference signal). The transmitting/receiving sections 203 transmit a UL signal (for example, at least one of a PUCCH (UCI), a PUSCH (UL data, higher layer control information, UCI), a UL reference signal).

The transmitting/receiving sections 203 receive downlink control information including a certain field indicating a frequency domain resource assigned to the PDSCH or the PUSCH. The transmitting/receiving sections 203 may receive the MIB via the PBCH. The transmitting/receiving sections 203 may receive at least one of SIB1 and the RRC message.

Figure 10:
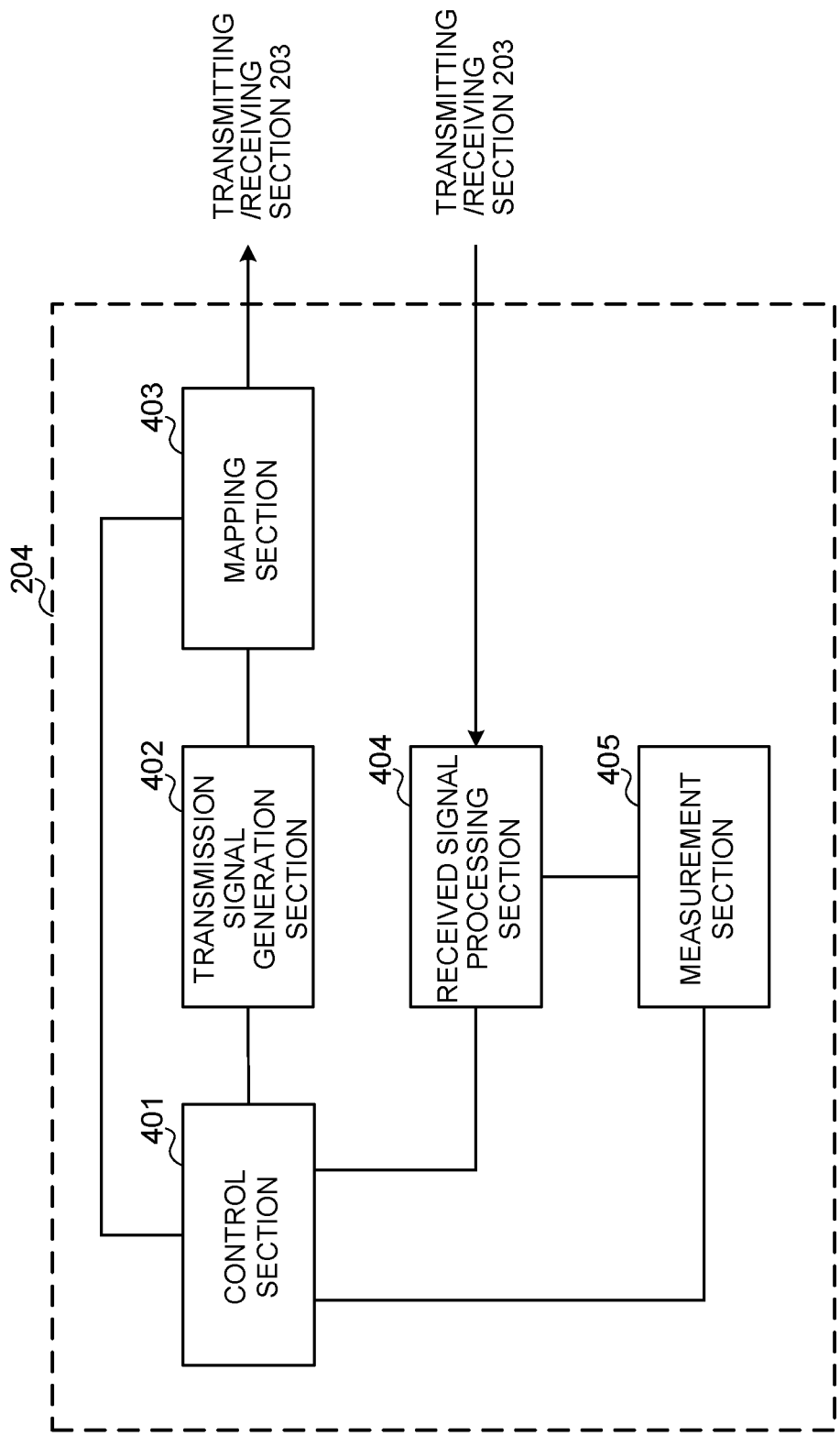
FIG. 10 is a diagram to show an example of a functional structure of the user terminal according to the present embodiment.

FIG. 10 is a diagram to show an example of a functional structure of a user terminal according to the present embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 monitors (blind decodes) CORESET (or a search space) and detects DCI. Specifically, the control section 401 may control detection of DCI including a certain field (for example, a frequency domain assignment field) indicating a frequency domain resource assigned to the PDSCH or the PUSCH.

The control section 401 may control reception of a PDSCH or transmission of a PUSCH. Specifically, the control section 401 may control reception of a PDSCH or transmission of a PUSCH, based on whether the state of the user terminal is the connected state or not. The control section 401 may control reception of a PDSCH or transmission of a PUSCH, based on whether information about an initial BWP (band for the initial access) in the carrier is given by higher layers or not. The control section 401 may control reception of a PDSCH or transmission of a PUSCH, based on the DCI including the above-described certain field.

The control section 401 may control determination of the bandwidth of the initial BWP, based on at least one of whether the state of the user terminal is the connected state or not, and whether information about the initial BWP (band for the initial access) in the carrier is given by the higher layers or not.

For example, if the state of the user terminal is the connected state and the information about the initial BWP is given by the higher layers, the control section 401 may determine the number of bits of the certain field, based on the bandwidth given by specified information in the information about the initial BWP (the first aspect).

On the other hand, if the state of the user terminal is not the connected state, or if the information about the initial BWP is not given by the higher layers, the control section 401 may determine the number of bits of the certain field, based on the bandwidth given by the index (index in the MIB) transmitted via the PBCH (the first aspect).

If the state of the user terminal is the connected state and the information about the initial BWP is given by the higher layers, the control section 401 may control the bit selection in the rate matching of the PDSCH or the PUSCH, based on the bandwidth given by specified information in the information about the initial BWP (the second aspect).

If the state of the user terminal is not the connected state, or if the information about the initial BWP is not given by the higher layers, the control section 401 may control the bit selection in the rate matching of the PDSCH or the PUSCH, based on the bandwidth given by the index (index in the MIB) transmitted through broadcasting (the second aspect).

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generating circuit or signal generating apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates UL data signals based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and output the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor. a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these plurality of pieces of apparatus.

Figure 11:
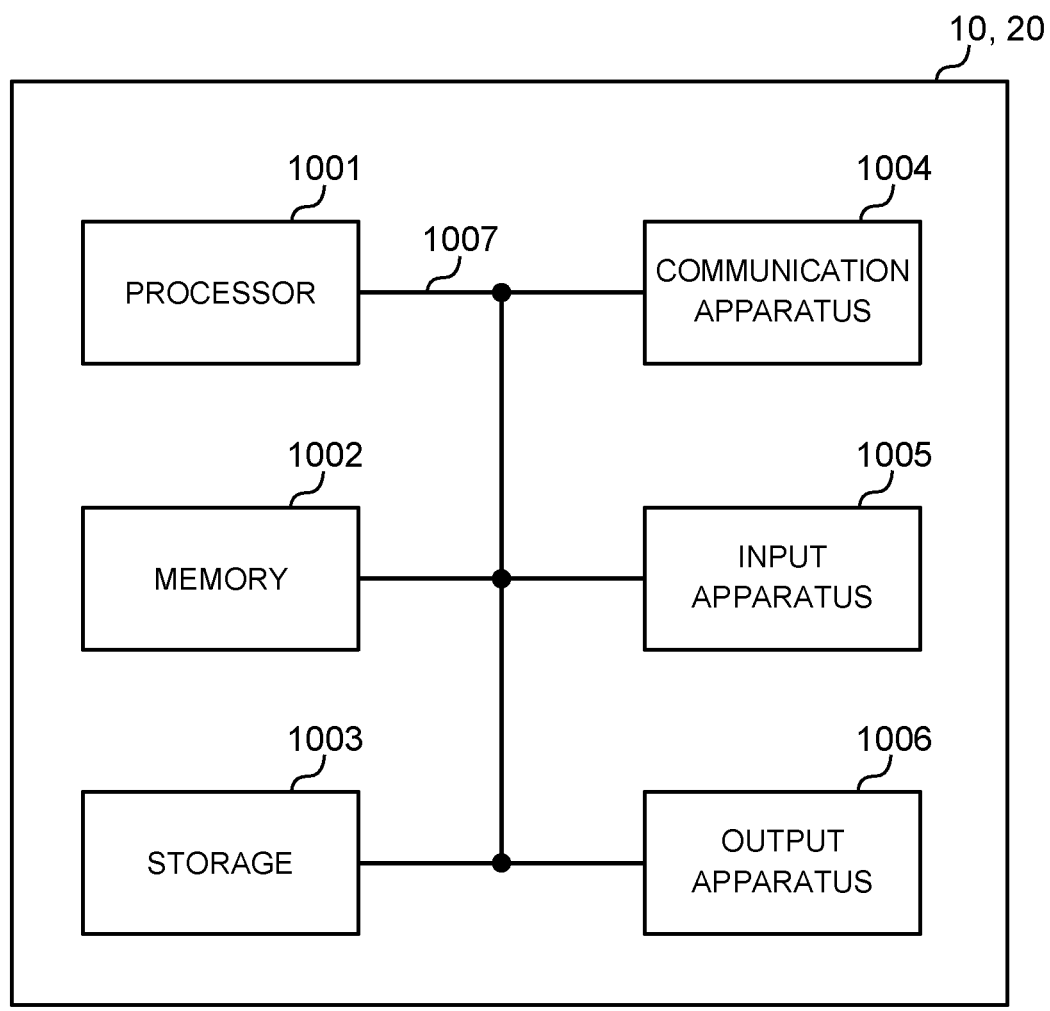
FIG. 11 is a diagram to show an example of a hardware structure of a radio base station and a user terminal according to the present embodiment.

For example, a radio base station, a user terminal, and so on according to the present embodiment of the present disclosure may function as a computer that executes the processes of the radio communication method of the present disclosure. FIG. 11 is a diagram to show an example of a hardware structure of a radio base station and a user terminal according to the present embodiment. Physically, the above-described radio base station 10 and user terminals 20 may each be formed as computer apparatus that includes a processor 1001, a memory 1002, a storage 1003, communication apparatus 1004, input apparatus 1005, output apparatus 1006, a bus 1007, and so on.

Note that, in the following description, the word "apparatus" may be interpreted as "circuit," "device," "unit," and so on. Note that the hardware structure of the radio base station 10 and the user terminals 20 may be designed to include one or more of apparatuses shown in the drawings, or may be designed not to include part of apparatuses.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to do calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (read only memory), an EPROM (erasable programmable ROM), an EEPROM (electrically EPROM), a RAM (random access memory), and other appropriate storage media. The memory 1002 may be referred to as a "register," a "cache," a "main memory (primary storage apparatus)," and so on. The memory 1002 can store executable programs (program codes), software modules, and/or the like for implementing a radio communication method according to the present embodiment.

The storage 1003 is a computer-readable recording medium, and may be constituted with, for example, at least one of a flexible disk, a floppy (registered trademark) disk, a magneto-optical disk (for example, a compact disc (CD-ROM (compact disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (application-specific integrated circuit), a PLD (programmable logic device), an FPGA (field programmable gate array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal", and so on, depending on which standard applies. Furthermore, a "component carrier (CC)" may be referred to as a "cell," a "frequency carrier," a "carrier frequency," and so on.

Furthermore, a radio frame may be constituted of one or a plurality of periods (frames) in the time domain. Each of one or a plurality of periods (frames) constituting a radio frame may be referred to as a "subframe." Furthermore, a subframe may be comprised of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable names. For example, one subframe may be referred to as a "transmission time interval (TTI)," a plurality of consecutive subframes may be referred to as a "TTI," or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," and so on. A TTI that is shorter than a normal TTI may be referred to as a "shortened TTI," a "short TTI," a "partial or fractional TTI," a "shortened subframe," a "short subframe," a "mini-slot," a "sub-slot," and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair," and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRCConnectionSetup message, an RRCConnectionReconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this piece of information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other names, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used herein are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (device-to-device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network comprised of one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second," and so on as used herein does not generally limit the quantity or order of these elements. These designations are used only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the term "A and B are different" may mean that "A and B are different from each other." The terms "separate," "be coupled," and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described herein. The invention according to the present disclosure can be implemented with various corrections and in various modifications, without departing from the spirit and scope of the present invention defined by the recitations of claims. Consequently, the description herein is provided only for the purpose of explaining examples, and should by no means be construed to limit the invention according to the present disclosure in any way.

The disclosure of Japanese Patent Application No. 2018-138884, filed on Jul. 5, 2018, including the specification, drawings and abstract, is incorporated herein by reference in its entirety.

What is claimed is:

1. A terminal comprising:
a receiver that receives downlink control information including a field that indicates a frequency domain resource assigned to a downlink shared channel; and
a processor that, when the terminal is in a connected state and information regarding an initial downlink bandwidth part (BWP) for a cell is provided via a higher layer, determines a bandwidth based on a specified information included in the information regarding the initial downlink bandwidth part (BWP), the determined bandwidth being used for determining a number of bits in the field.

2. The terminal according to claim 1, wherein if the information regarding the initial downlink BWP is not provided by a higher layer, the processor determines a bandwidth, used for determining the number of bits in the field, based on an index in a master information block (MIB).

3. The terminal according to claim 2, wherein the processor controls a bit selection in a rate matching of the downlink shared channel based on the bandwidth.

4. The terminal according to claim 2, wherein the information regarding the initial downlink BWP is included in a system information block (SIB1) or in a radio resource control (RRC) message.

5. The terminal according to claim 1, wherein the processor controls a bit selection in a rate matching of the downlink shared channel based on the bandwidth.

6. The terminal according to claim 5, wherein the information regarding the initial downlink BWP is included in a system information block (SIB1) or in a radio resource control (RRC) message.

7. The terminal according to claim 1, wherein the information regarding the initial downlink BWP is included in a system information block (SIB1) or in a radio resource control (RRC) message.

8. A radio communication method for a terminal comprising:
receiving downlink control information including a field that indicates a frequency domain resource assigned to a downlink shared channel; and
when the terminal is in a connected state and information regarding an initial downlink bandwidth part (BWP) for a cell is provided via a higher layer, determining a bandwidth based on a specified information included in the information regarding the initial downlink bandwidth part (BWP), the determined bandwidth being used for determining a number of bits in the field.

9. A base station comprising:
a processor and a transmitter, wherein:
the transmitter transmits downlink control information including a field that indicates a frequency domain resource assigned to a downlink shared channel;
when a terminal is in a connected state and the transmitter transmits information regarding an initial downlink bandwidth part (BWP) for a cell via a higher layer, a bandwidth is determined, by the terminal, based on a specified information included in the information regarding the initial downlink bandwidth part (BWP), the determined bandwidth being used for determining a number of bits in the field.

10. A system comprising a base station and a terminal, wherein:
the base station comprises:
a transmitter that transmits downlink control information including a field that indicates a frequency domain resource assigned to a downlink shared channel;
the terminal comprises:
a receiver that receives the downlink control information; and
a processor that, when the terminal is in a connected state and information regarding an initial downlink bandwidth part (BWP) for a cell is provided via a higher layer, determines a bandwidth based on a specified information included in the information regarding the initial downlink bandwidth part (BWP), the determined bandwidth being used for determining a number of bits in the field.

* * * * *